F. W. BURCH.
FRUIT PICKING BAG.
APPLICATION FILED FEB. 10, 1911.

1,029,486.

Patented June 11, 1912.

2 SHEETS—SHEET 1.

Attest.
Bent M. Stahl.
Ew Saxton.

Inventor.
F. W. Burch
by Spear, Middleton, Donaldson & Spear
Attys.

F. W. BURCH.
FRUIT PICKING BAG.
APPLICATION FILED FEB. 10, 1911.

1,029,486.

Patented June 11, 1912.
2 SHEETS—SHEET 2.

UNITED STATES PATENT OFFICE.

FREDERICK WILLIAM BURCH, OF PUEBLO, COLORADO.

FRUIT-PICKING BAG.

1,029,486. Specification of Letters Patent. Patented June 11, 1912.

Application filed February 10, 1911. Serial No. 607,866.

*To all whom it may concern:*

Be it known that I, FREDERICK W. BURCH, citizen of the United States, residing at Pueblo, Colorado, have invented certain new and useful Improvements in Fruit-Picking Bags, of which the following is a specification.

One object of my invention is to provide means for preventing the fruit pickers from dropping the fruit into the bag and thus causing damage to the same, said means consisting of a bag with a closed top, and with side pockets or openings through which the picker must thrust his hand in order to place the fruit in the bag, and will cause him to properly deposit the fruit without damage thereto.

Another object of my invention is to provide a bag having an outlet mouth for the fruit so constructed that in transferring or dumping the fruit from the bag into the box or other receptacle, the fruit will be discharged without damage by the action of one fruit upon another.

Other objects of my invention will appear hereinafter.

The invention consists in the features and combination and arrangement of parts hereinafter described and particularly set forth in the appended claim.

Figure 1:
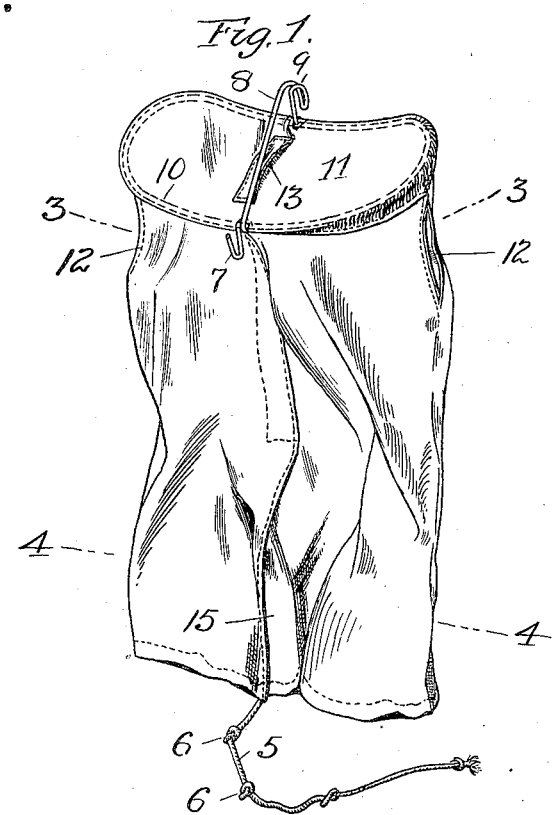
Figure 2:
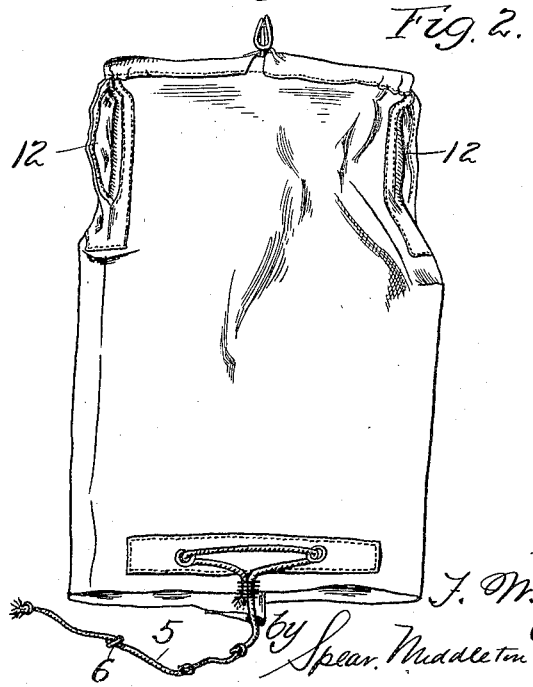
Figure 3:
Figure 4:
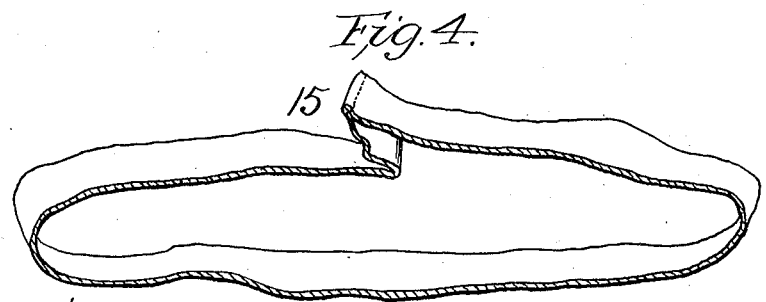

In the accompanying drawings Figure 1 is a perspective view of a fruit picker bag embodying my invention; Fig. 2 is a view of the inner or rear side opposite to the side shown in Fig. 1; Fig. 3 is a sectional view substantially on the line 3—3 of Fig. 1; Fig. 4 is a sectional view substantially on the line 4—4 of Fig. 1; and Fig. 5 is a view of a metallic casing or framework to be used at the upper end of the bag.

The general form of the bag includes a suspension member 5 consisting of a rope with knots 6 thereon at different points, said rope being connected to the lower end of the bag on the rear side, so that by passing the rope over a hook 7, the lower portion of the bag may be doubled upon the upper portion so as to make the capacity of the bag small for the beginning of the picking operation, the doubled portion of the bag forming the bottom thereof, and this being gradually lowered as the bag is filled by causing the hook 7 to engage the knots of the rope in succession. This hook 7 is carried by a suspension bar 8 having a hook at 9 to engage any suitable suspending means, as bands or straps carried over the shoulders of the pickers, and this suspension bar is connected with a frame or bar 10 at the top of the bag which holds this upper end in proper shape, and with its sides apart. The upper end of the bag is closed by the canvas or other material 11 extending across from side to side of the frame 10, and suitably secured thereto. Openings 12 are formed in the vertical sides of the bag immediately below the upper closed end, and while I have shown these openings at opposite sides, I do not limit myself in respect to the number of openings. When the bag is adjusted to its minimum capacity by turning up the lower portion and holding it by the knotted rope, the bottom of the bag thus temporarily formed is raised adjacent to the opening 12, so that the picker, in placing his hand through the opening 12 to deposit the fruit, can not drop the fruit any appreciable distance to cause damage thereto because of the proximity of the temporary bottom to the opening 12, and because the picker must thrust his hand through the opening 12 before he lets go of the fruit. When the bag is adjusted for its minimum capacity, there is just room for one layer of fruit, such as oranges, in the same, and after this layer has been deposited and the bag is lengthened, room is provided for another layer, which will be deposited close to the opening 12, and thus it is impossible for the picker to throw or drop the fruit such a distance as would cause damage thereto.

Ordinarily the bottom of a fruit picking sack is of the same diameter or size or a little smaller in diameter than the top portion of the bag, and when the picker opens up the bottom of an ordinary bag to dump the fruit, the fruit will roll around and strike against each other and against the sides of the receiving box in seeking a level, and thus damage results thereto. To overcome this objection, I provide the lower end of the bag with a tuck or fold at 15, so that the diameter of the bag at this lower end when the fold or tuck is spread out will be greater than the upper portion of the bag, and when the picker unhooks the knot and lets the bag down, as shown in Fig. 1, the fruit will find a level before it leaves the sack, as the tuck or fold will loosen up and the sack will expand to substantially the size of the packing box, and when the sack is pulled up, the fruit will remain in substantially the position in which it left the bag. Upon the top of the bag 11 I place a loop or strap 13 to receive the shears that pickers use in cutting the stems of the oranges or other fruit, so that he can place the shears and have them held in a convenient position ready for use when required. I prefer to form the suspending hook 9 directly on the frame instead of having this hook on the suspending strap or device which is carried by the picker.

Figure 5:
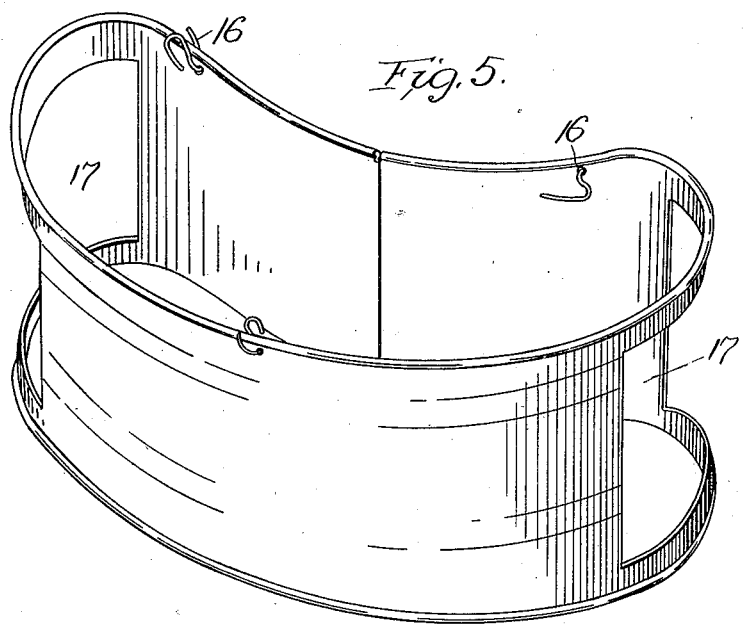

In Fig. 5 I show a metallic frame or casing which may be inserted in the top of the frame and held thereto by means of the hooks 16, the object of this frame being to protect the fruit at the upper end of the bag if the picker leans up against a ladder or other object, this metallic casing or frame having openings as at 17 to register with the openings 12 so that the hand of the picker can be thrust through to deposit the fruit. This frame can be used in connection with the bag shown in Fig. 1, and it can be hooked over the frame 10 from the inside, or it can be used to take the place of the frame 10 if desired.

As will be seen from the sectional view, Fig. 3, there is a flap on the inner side of the bag at the openings 12, this flap extending vertically along one edge at the opening, and extending across the said opening beyond the other edge and lying on the inner side thereof. This flap presents an obstruction to the fruit if it is attempted to throw the same through the opening without introducing the hand to a point within the bag. Furthermore, the edges of the material at the opening are not reinforced, and, as shown, these edges lie closely together, so that in each act of depositing the fruit within the bag, the picker must thrust his hand through the opening and then deposit the fruit therein. The openings will tend to keep closed owing to the weight of the material and the weight of the fruit in the bag which, by drawing the material downwardly, will throw the edges on opposite sides of the opening together, so that they are practically in contact, thus necessitating that the picker exercise care in introducing the fruit instead of throwing the fruit through the opening. In this way damage to the fruit is prevented by the use of my device.

I claim as my invention:

In combination a fruit picker bag to receive the fruit at its upper end and having an enlarged lower portion provided with a vertically disposed fold or tuck which when folded reduces said enlarged portion to the same diameter as the main portion, and means for folding the bag to different lengths, said lower folded portion spreading automatically as the bag is lowered to its full length for the discharge of the fruit.

In testimony whereof, I affix my signature in presence of two witnesses.

FREDERICK WILLIAM BURCH.

Witnesses:
HORACE POLLARD,
FRANKLIN J. BURCH.

---

Copies of this patent may be obtained for five cents each, by addressing the "Commissioner of Patents, Washington, D. C."